United States Patent [19]

Skewis

[11] 4,049,228

[45] Sept. 20, 1977

[54] ADJUSTABLE TRUCK SIDE MIRROR SYSTEM ADJUNCT

[76] Inventor: William A. Skewis, P.O. Box 251, Sequim, Wash. 98882

[21] Appl. No.: 678,141

[22] Filed: Apr. 19, 1976

[51] Int. Cl.$^2$ ............................................. B60R 1/06
[52] U.S. Cl. .................................................. 248/480
[58] Field of Search ........................ 248/480, 486, 487

[56] References Cited

U.S. PATENT DOCUMENTS

| 763,380 | 6/1904 | Eble et al. | 248/480 |
|---|---|---|---|
| 1,194,746 | 8/1916 | Keeler | 248/480 |
| 1,654,751 | 1/1928 | Oishei | 248/487 |
| 1,862,094 | 6/1932 | Oishei | 248/480 X |
| 3,282,549 | 11/1966 | Crawford | 248/486 X |
| 3,384,334 | 5/1968 | Malachowski | 248/487 X |
| 3,482,811 | 12/1969 | Zent | 248/480 |
| 3,667,718 | 6/1972 | Goslin et al. | 248/487 |
| 3,730,612 | 5/1973 | Arroyo | 248/480 X |

FOREIGN PATENT DOCUMENTS

458,186 12/1936 United Kingdom ................ 248/480

Primary Examiner—William H. Schultz
Attorney, Agent, or Firm—Seed, Berry, Vernon & Baynham

[57] ABSTRACT

A side mirror system is disclosed for securing to the cab door of a truck. The mirror of the system is a conventional elongated, rectangular production mirror secured to mounting brackets so that the upper edge of the mirror is beneath the direct line of sight of the driver of the truck so as to minimally obstruct his side angle vision. The mirror is preferably vertically adjustable with respect to the mounting brackets to allow the driver of the truck to adjust the mirror vertically to a position to minimally obstruct his side angle vision while allowing unobstructed rear vision through the mirror.

5 Claims, 5 Drawing Figures

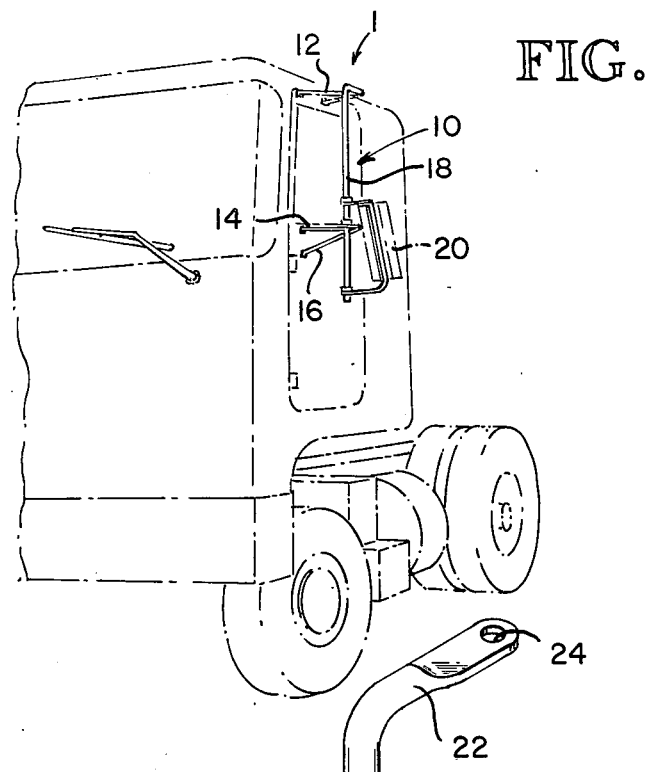
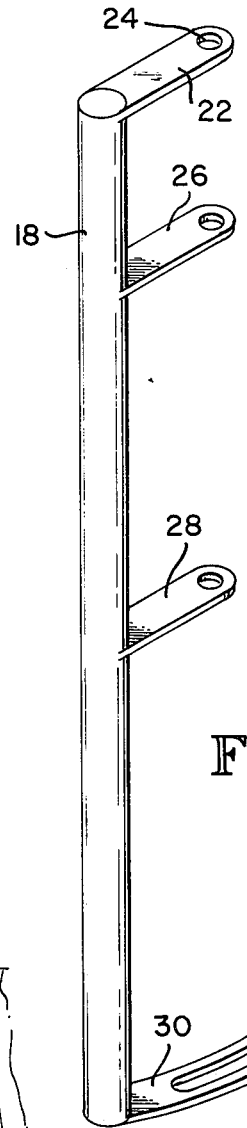
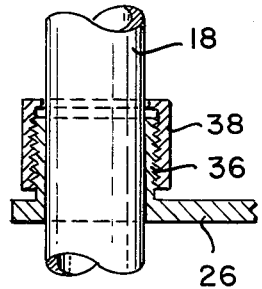
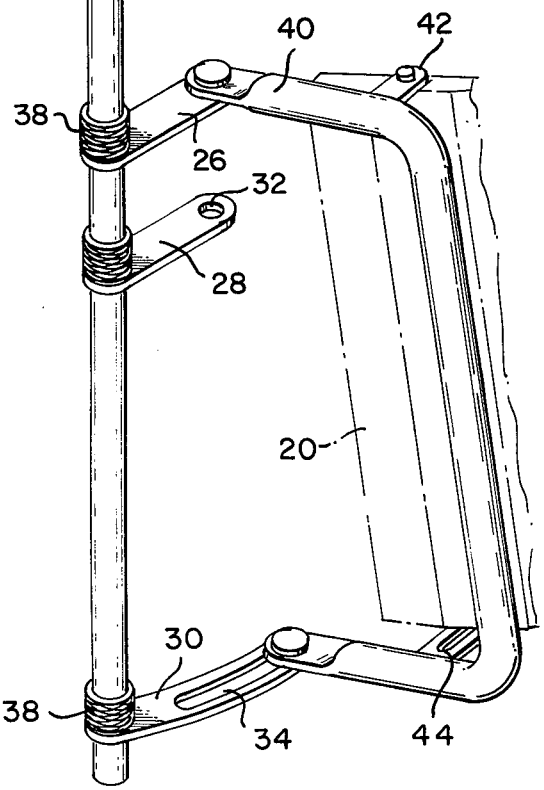
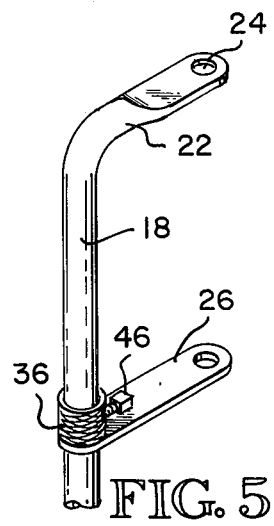
FIG. 1
FIG. 2
FIG. 3
FIG. 4
FIG. 5

ADJUSTABLE TRUCK SIDE MIRROR SYSTEM ADJUNCT

BACKGROUND OF THE INVENTION

1. Field of the Invention

This invention relates to a truck side mirror unit for securing to the cab door of a truck.

2. Prior Art Relating to the Disclosure

Elongated, rectangular side mirrors are in extensive use on trucks. They generally are mounted to the cab door of the truck directly opposite the driver of the truck with the mirror extending the height of the side window of the truck and the upper edge of the mirror terminating at or near the top of the side window of the truck. These mirrors are generally adjustable about an axis extending the length or width of the mirror. One of the problems of the mirrors of this type is that they obstruct the side angle vision of the driver, particularly when the driver of the vehicle is entering an intersection.

SUMMARY OF THE INVENTION

It is a primary object of this invention to provide a vertically oriented, elongated, rectangular truck side mirror unit secured for vertical adjustment to the cab door of the truck, the upper terminating edge of the mirror being below the line of sight of the driver of the truck so as to minimally obstruct the side angle vision of the driver while allowing him unobstructed rear vision.

It is a further object of this invention to provide a side mirror unit for a truck including (1) mounting brackets and (2) an elongated, rectangular, vertically-oriented mirror secured with the mounting brackets to the cab door of the truck. The upper edge of the mirror is positioned below the line of sight of the driver so as not to obstruct his side vision while driving.

It is a further object of this invention to provide a side mirror unit for a truck which can be secured to existing arm brackets of conventional side mirror units.

BRIEF DESCRIPTION OF THE FIGURES OF THE DRAWINGS

FIG. 1 is a perspective view of a truck employing the side mirror unit of this invention;

FIG. 2 is a perspective view of the preferred type of side mirror unit;

FIG. 3 is a partial sectional view of the adjustment mechanism of FIG. 2;

FIG. 4 is a perspective view of a modified type of mounting bracket; and

FIG. 5 is a partial perspective view of an adjustment mechanism for the mirror.

DETAILED DESCRIPTION OF THE INVENTION

FIG. 1 illustrates in phantom a truck including the side mirror unit 10 described herein. The rear view mirrors generally used for trucks are elongated, rectangular mirrors about six inches wide and sixteen inches long. Conventionally, the mirrors are secured by support brackets extending outwardly from the cab door of the truck. Mounting of the mirrors in the conventional manner obstructs a portion of the side vision of the driver of the truck, particularly at intersections. The mirror unit of this invention makes use of some of the existing mounting brackets conventionally used to secure the mirrors.

Referring to FIG. 1, the conventional mounting bracket includes a pair of upper arms 12 secured at one end near the top edge of the cab door of the truck above the side window and a pair of lower arms 14 secured to the cab door below the side window. Both the upper and lower arms 12 and 14 extend laterally outwardly beyond the vertical plane of the trailer or other unit being pulled by the truck to allow the driver unobstructed rear vision. A support bracket 16 extending at a diagonal from the lower arms and connecting with the cab door of the truck may be used. A vertical rod 18 is secured to the outer ends of the upper and lower arms 12 and 14, respectively. The rod is sufficiently long to extend beneath the lower arms 14 a distance approximately two-thirds the length of the mirror. The mirror 20 is secured to the rod 18.

FIG. 4 illustrates one form of a mounting bracket to which the rectangular mirror 20 may be secured.

In FIG. 2 the bracket comprises a length of rod 18 having integral laterally extending extensions 22, 26, 28 and 30. Extensions 22 and 28 extend parallel to one another and are adapted to secure the rod 18 to the upper and lower arms 12 and 14 by suitable means such as rivets. Extension 30 may extend laterally from the rod 18 at a different angle than extensions 22, 26 and 28 if desired. Extensions 26 and 30 support mirror 20. If desired, the lower extension 30 may include a slot 34 for adjustment of the angle of the mirror.

The preferred mounting system for the mirror 20 is illustrated in FIG. 2 and includes a rod section 18 curved and flattened at its upper end to form a lateral extension 22 having an opening 24 therein for securing the rod to the upper arm 12. Additional lateral extensions 26, 28 and 30 are adjustably secured along the length of the rod 18. Extensions 26 and 30 support the mirror 20. Extension 28 has an opening 32 therein for securing the rod 18 to the lower arms 14 by bolts, rivets or other suitable means. If desired, the lower bracket 30 may include a slot 34 therein for adjustment of mirror 20. Each of the extensions 26, 28 and 30 has a integral threaded flange portion 36 thereon adapted to slide along the rod 18. A collet 38 is threadably secured to each of the flange portions 36 to allow vertical adjustment of the extensions 26, 28 and 30 along the length of rod 18 to any desired position. Screwing the collets 38 down over the threaded flange portions 36 of each of the extensions, causes the internal surface of the flange portions to frictionally engage the rod 18 and hold the extension in place at that point.

For mounting of mirror 20, a U-shaped bracket 40 is secured at its respective ends to extensions 26 and 30 by bolts or other suitable means. If desired, the lower leg of the U-shaped bracket may be secured to ride in the slot 34 to tilt the mirror 20 secured to bracket 40. Mirror 20 is pivotally secured at its upper and lower ends to ears 42 and 44 which extend outwardly from the bracket 40 as illustrated in FIG. 2.

The mirror 20 may be lowered or raised as necessary to give the driver of the truck adequate rear vision without obstructing his side vision. FIG. 4 illustrates an alternate means for vertically adjusting and holding the mirror 20 in a fixed position along rod 18. The extensions 26, 28 and 30 are held in position by set screws 46 which are threaded through the flange portions 36 to frictionally engage rod 18.

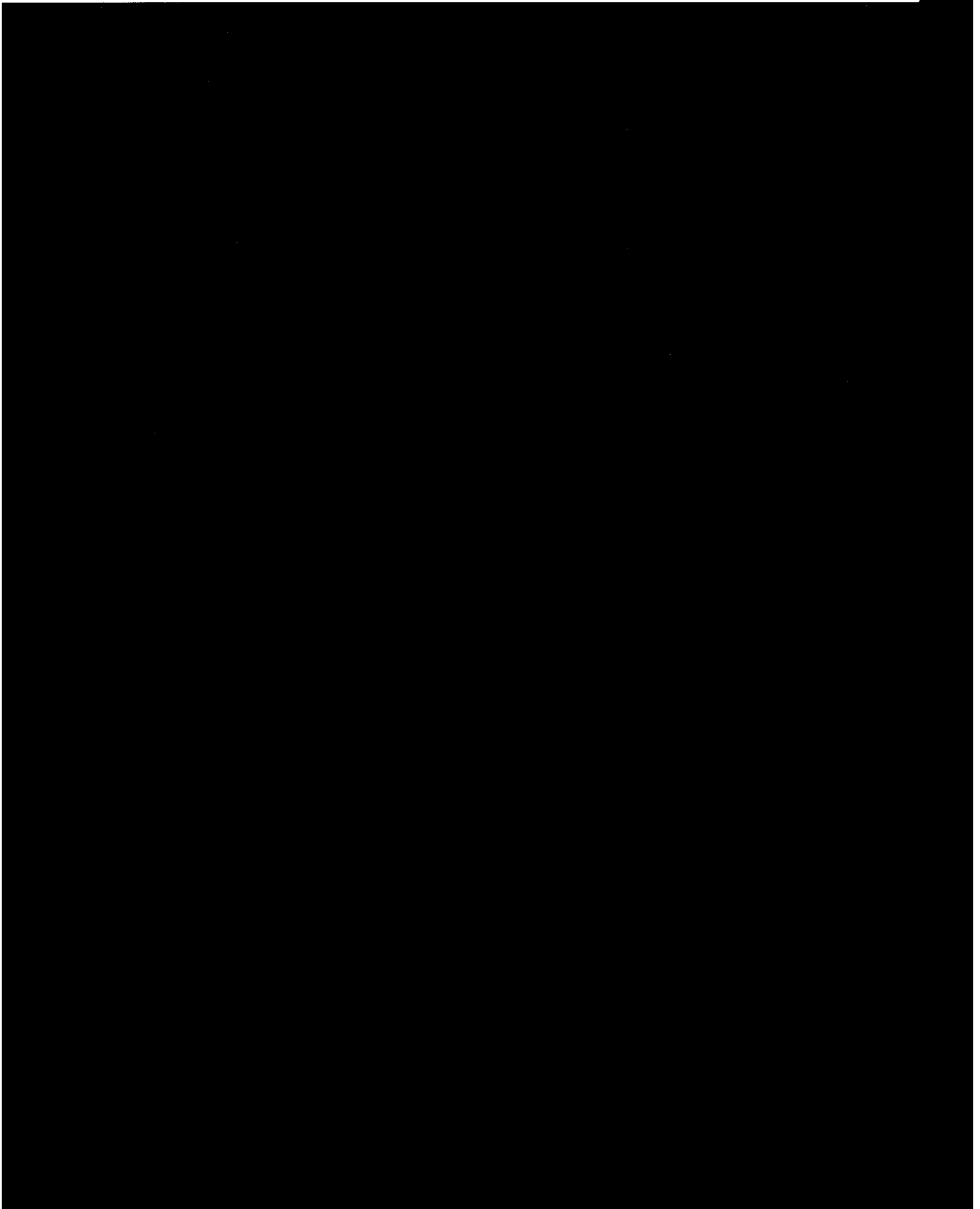

The embodiments of the invention in which a particular property or privilege is claimed are defined as follows: